I. YASSENOFF.

RECIPROCATING MOTOR.

APPLICATION FILED AUG. 13, 1909.

Reissued July 12, 1910. 13,133.

WITNESSES:

G. M. Gridley

A. Rager.

INVENTOR.

Isidor Yassenoff

BY

Geo. W. Rightmire

ATTORNEY.

THE NORRIS PETERS CO., WASHINGTON, D. C.

UNITED STATES PATENT OFFICE.

ISIDOR YASSENOFF, OF COLUMBUS, OHIO.

RECIPROCATING MOTOR.

13,133. Specification of Reissued Letters Patent. Reissued July 12, 1910.

Original No. 894,928, dated August 4, 1908, Serial No. 396,318. Application for reissue filed August 13, 1909. Serial No. 512,763.

*To all whom it may concern:*

Be it known that I, ISIDOR YASSENOFF, a citizen of the United States, residing at Columbus, in the county of Franklin and State of Ohio, have invented certain new and useful Improvements in Reciprocating Motors, of which the following is a specification.

My invention relates to improvements in reciprocating motors and consists in the provision of a hydraulic motor having a valve chamber outside of the cylinder, which is adapted to travel with the piston rod, the latter being made tubular and divided longitudinally into two passages, one of said passages having communication with the cylinder on one side of the piston, the other passage communicating with the cylinder on the opposite side of the piston; with this construction the valve chamber is always accessible for reconstruction and repair, without entering the cylinder. Provision is made for readily removing the piston from the cylinder when it is desired.

My invention further consists in the mounting of the parts of the motor upon a base so constructed that the alining of the cylinder and the actuating rack and valve chamber is accomplished with ease and certainty; further, the parts may readily be lifted from the base and may also readily be separated from each other, so that the operating rack, the piston rod, and the valve chamber interposed between the two to travel therewith, may be detached from each other, the cylinder may be taken from the base, and an end thereof readily detached, whereupon the piston may be quickly removed from the cylinder.

It further consists in providing slide valves controlled by a plate at each end thereof, said plate being provided with a pin projecting through and beyond the valve chamber, whereby at the end of a stroke of the piston in either direction, one of said pins is brought into contact with a spring mounted dog which drives the plate on that side of the valves into contact therewith and thereby opens the valves from the opposite sides, for a purpose which will clearly appear hereinafter in the description. The pin mentioned is preferably provided with a packing intermediate its ends to prevent the water which passes through the valves from issuing through the bearings of the pin.

My invention comprises the foregoing improvements and others which will be more specifically hereinafter set forth.

Figure 1:
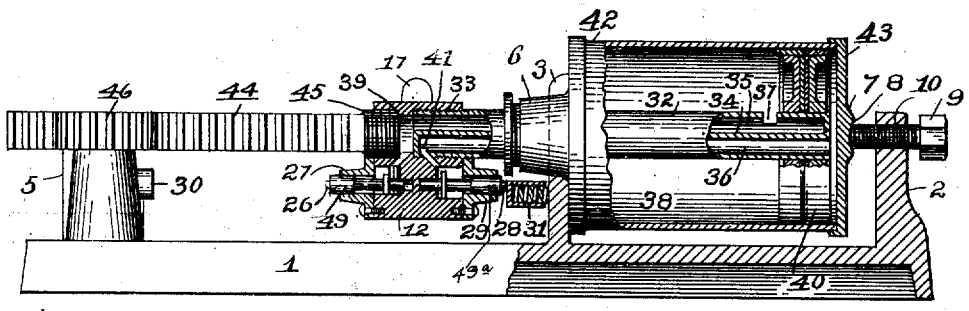
Figure 2:
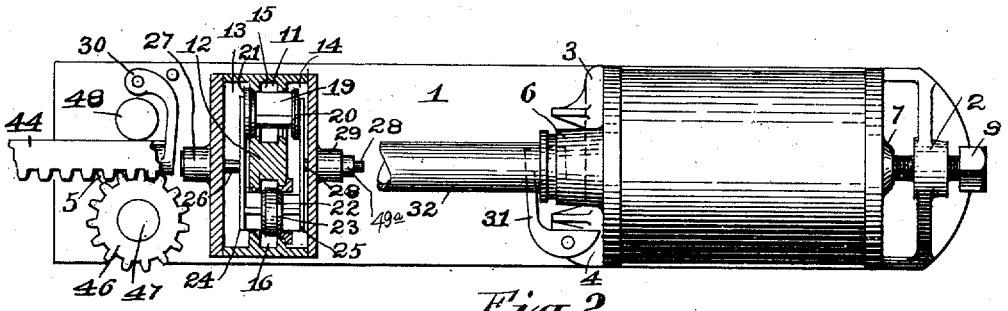
Figure 4:
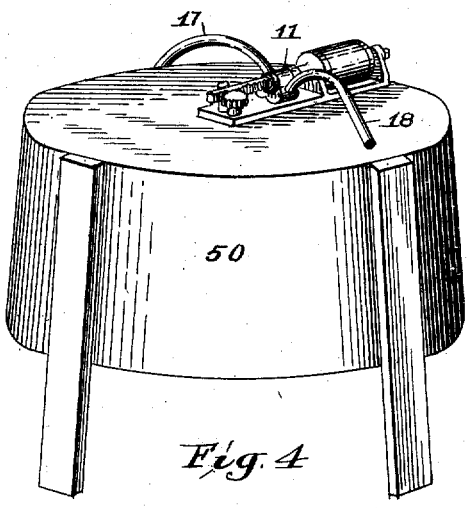
Figure 3:
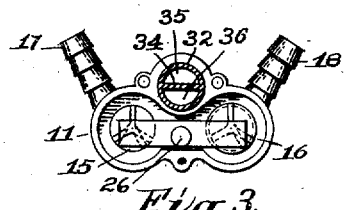

Referring to the drawings, which are hereto attached and hereby made a part of this specification, Figure 1 is a longitudinal vertical section of my improved hydraulic motor; Fig. 2 is a plan view with the valve chamber in section; Fig. 3 is an end elevation of the valve chamber; Fig. 4 is a perspective of a washing machine having my improved motor thereon in place.

In the accompanying drawings, in which the same numerals indicate the same parts throughout, 1 is the base upon which are provided the upright frame members 2, 3, 4, and 5, supporting the cylinder and operating parts; the cylinder at one end 6 is positioned between the frame members 3 and 4, and at its other end is provided with the enlargement 7 having therein a shallow depression 8 with which engages the set screw 9, the latter being inserted through the threaded opening 10 at the upper end of the frame member 2. The position of the set screw being fixed by the construction of the parts, and the positioning of the enlargement 6 at one end of the cylinder being also determined by the upright frame members 3 and 4, three bearing points for the cylinder are thus provided which renders its alinement certain. The valve chamber is shown at 11, having the dividing wall 12, whereby the valve chamber is divided into the two compartments 13 and 14; the dividing wall 12 is chambered at each end as shown at 15 and 16, the outlet for the water being shown at 17 from chamber 15, the inlet through chamber 16 being shown at the pipe or tube 18.

An opening is provided through the dividing wall 12 of the valve chamber 11 into the chamber 15, said opening communicating with the compartments 13 and 14, and a sliding valve 19 is mounted in said opening, said valve being flanged at each end thereof as shown at 20 and 21. When the valve 19, as shown in Fig. 2, is moved to the right until the flange 21 engages against the opening in the dividing wall, said opening is closed thereby at that end, but is opened at the opposite end, so that there is communication established between compartment 14 and the internal chamber 15, the latter communicating with the tube 17. Inasmuch as all the water admitted into the valve chamber 11 must be conducted to the piston and through the cylinder, means will hereinafter be described for accomplishing this purpose. Valve 22 is located in a similar opening through the dividing wall at the opposite side of the valve chamber 11, and is constructed with a circumferential flange 23 which is positioned in the internal chamber 16 loosely, so that said valve may slide either forwardly or rearwardly to bring its flange 23 into contact with either of the walls inclosing said chamber 16, as desired. In the position of the parts shown in Fig. 2, it is seen that valve 22 is closed to fluid found in the compartment 14, whereas it is open to fluid found in the compartment 13; therefore, as shown, valve 19 is in communication with compartment 14 when valve 22 is in communication with compartment 13, and vice versa. Therefore, it is clear, that in the position of the parts shown in Fig. 2, compartment 14 is in communication with internal chamber 15 and pipe 17, while compartment 13 is in communication with internal chamber 16 and pipe 18.

The valves 19 and 22 are under the control of the plates 24 and 25, each of said plates having projecting therefrom a pin 26, the latter having a sliding bearing in the enlargement 27 on the valve chamber 11. A similar pin 28 is provided on the opposite side, having a sliding bearing in the enlargement 29 of the valve chamber 11. The valves are controlled by contact with the plate members 24 and 25 described, the latter being actuated by the pin thereon when said valve chamber is at the end of its travel in either direction, by the engagement of the pin against a spring dog 30 at one end of the travel and 31 at the opposite end. In the position of the parts shown in Fig. 2, the piston has reached its limit of travel toward the left, thereby bringing the valve chamber toward the left end of the base 1, so that the pin 26 has engaged against the spring dog 30, thereby driving the pin inwardly and engaging the plate against the ends of the valves 19 and 22; so that in this position of the parts, the valves are thrown open to the compartments described above, and as the piston travels toward the right the direction of the flow of the water, which may be into or out of the compartments, will be determined by the position which the valves have been made to assume. When the piston reaches the end of the travel in this direction, pin 28 will engage against the spring mounted dog 31, which will drive the valves in the opposite direction into a position for the valves not illustrated, but which as readily seen will be such that communication between compartment 13 and internal chamber 15 will be established, and communication between compartment 14 and internal chamber 16 will also be established.

The flow of water into and out of the cylinder for actuating the piston takes place through the tubular stem 32, which is preferably secured in the dividing wall 12 of the valve chamber 11, as shown in Fig. 1 at 33; preferably the end of the stem 32 is threaded so that it may be easily positioned and detached. The stem 32 is divided longitudinally by the wall 34 into the two longitudinal passageways 35 and 36; passageway 35 communicates through the opening 37 adjacent its inner end with the cylinder 38, and at its outer end communicates through the opening 39 with the compartment 13 of the valve chamber 11; whereas passageway 36 communicates at its inner end with the cylinder on the opposite side of the piston 40 from that with which passageway 35 communicates, and at its outer end said passageway 36 communicates through opening 41 with compartment 14 of valve chamber 11.

In the position of the parts shown in Fig. 1, the portion of the cylinder communicating with passageway 35 will be filled with the water which has just been utilized in driving the piston toward the position there shown, and to drive the piston in the opposite direction to cause the parts to assume the position indicated in Fig. 2, it is clear that the fluid entering the cylinder must do so through passageway 36, thereby driving the piston outwardly, or toward the left as shown. Viewing the parts as positioned in Fig. 2, the piston is now ready for its travel toward the right, and this travel will be produced as follows: Water enters through pipe 18 into internal chamber 16 and passes outwardly therefrom into compartment 13, which communicates with passageway 35 through the opening 39; the water travels along its passageway 35 to the opening 37 into the cylinder, and filling the cylinder between the end wall 42 and the piston 40, it will exert pressure upon the face of the piston 40 adjacent the end wall 42, whereby the piston will be driven through the cylinder toward the end wall 43, to a position shown in Fig. 1; meanwhile the water filling the cylinder in the position of the parts shown in Fig. 2 will escape therefrom, as the piston travels inwardly, through the passageway 36, out through the opening 41, into the compartment 14, whence, the valve 19 being open on that side, the water escapes into internal chamber 15 and into pipe 17. When the parts reach the position indicated in Fig. 1, the pin 28 engages the spring dog 31, thereby driving the plate 25 inwardly against the ends of the valves, so that valve 19 is made to communicate with compartment 13 and valve 22 is thrown into communication with compartment 14; consequently, water will now enter through pipe 18 and internal chamber 16 into compartment 14 and thence will be conducted through the opening 41 through the passageway 36 into the cylinder adjacent the wall 43, whereby pressure is exerted against the face of the piston adjacent said end 43, tending to drive the piston toward the left, and the water in the cylinder will escape therefrom through opening 37 into passageway 35 and outward therefrom into compartment 13, and thence into internal chamber 15 and out through the pipe 17. The operation hereinbefore described will be repeated as the piston travels from one end to the other of its course. The piston being thus actuated, will carry along with it in its movement the rack bar 44, which, as shown in Fig. 1, is threaded at one end and secured at 45 in the dividing wall 12 of the valve chamber 11; the pinion 46 is mounted on the vertical shaft 47 which passes through the base 1 into the washing machine 50 shown in Fig. 4, and has attached at its lower end a stirrer. Through the actuation of the rack bar 44, the clothes in the washing machine are therefore agitated. Rack bar 44 preferably rests upon a post 5 and slides thereon in its inward and outward movement, while on its smooth side it engages against post 48 and is thereby held in proper position laterally. The pins 26, 28, carry thereon packing rings 49, 49[a], which prevent the escape of the water along the pin from either of the compartments in either position of the plates 24, 25.

As shown, and as preferably constructed, the rack bar is detachable from the valve chamber, the piston is also detachable therefrom, and the side walls of the valve chamber may also readily be taken therefrom, whereby access to the valves is afforded; therefore, if repair of any of the parts is needed, it may be quickly accomplished by detaching and separating the parts as mentioned. It will be noted also that the base portion with its frame members and posts thereon is constructed so as to render the positioning and removal of all parts quick and easy. In this class of machine, it is necessary to produce an article which may be sold cheaply and which may be repaired with only slight expense, and I have provided a hydraulic motor which has all of the advantages desired and which therefore has gone into very extensive use.

What I claim is:

1. A hydraulic motor construction comprising a cylinder, a piston adapted to reciprocate therein, a rack bar, a valve chamber secured to said rack bar and piston stem to travel therewith and having valves therein, and a base upon which said parts are removably located, comprising standards for supporting said cylinder and alining the same, a post upon the top of which said rack bar is adapted to be moved, and means mounted on said base for tripping the valves in said valve chamber.

2. A hydraulic motor construction comprising a base, standards supported on said base, a cylinder supported in said standards and alined thereby and having one end readily detachable, a piston stem projecting from said cylinder and adapted to reciprocate therein, a valve chamber mounted on said piston stem externally of said cylinder, and adapted to move therewith, and a rack bar secured in said valve chamber and adapted to move therewith, a post mounted on said base, said rack bar being movable upon the upper face of said post, valves in said valve chamber, and operating means therefor.

3. A hydraulic motor construction comprising a base, standards arising therefrom, a cylinder mounted in said standards and alined thereby, a tubular piston stem adapted for reciprocation in said cylinder, a valve chamber removably mounted upon said piston stem adjacent the outer end thereof externally of said cylinder and having valves therein, a rack bar removably secured to said valve chamber, a support on said base upon which said rack bar is adapted to travel and means mounted upon said base for tripping the valves.

4. A hydraulic motor construction comprising a cylinder, a piston therein, a tubular stem for said piston projecting from said cylinder and adapted to reciprocate therein, a valve chamber mounted on said piston stem externally of said cylinder and having compartments therein adapted to communicate through said tubular piston stem with said cylinder on opposite sides of said piston, valves in said valve chamber, and operating means therefor.

5. A hydraulic motor construction comprising a cylinder, a piston therein, a tubular piston stem projecting from said cylinder and adapted to reciprocate therein, a longitudinal wall through said tubular stem forming passageways therethrough, a valve chamber borne by said piston stem upon its outer end externally of said cylinder, a dividing wall in said valve chamber forming compartments therein, said compartments being in communication through said tubular piston stem with said cylinder on opposite sides of said piston, valves in said valve chamber, and operating means therefor.

6. A hydraulic motor construction comprising a cylinder, a piston therein, a tubular piston stem mounted in said cylinder for reciprocation, a longitudinal dividing wall in said stem, a valve chamber carried by said piston stem externally of said cylinder, a dividing wall in said valve chamber forming compartments therein, one of said compartments being in communication through one of the passageways of said tubular valve stem with said cylinder on one side of said piston, and the other of said compartments being in communication through the other passageway of said tubular valve stem with said cylinder on the other side of said piston, valves in said valve chamber, and operating means therefor.

7. A hydraulic motor construction comprising a cylinder, a piston having a tubular stem projecting from said cylinder mounted for reciprocation therein, a valve chamber construction borne by said piston stem externally of said cylinder, a dividing wall in said valve chamber forming compartments therein, said compartments being in communication through said tubular piston stem with said cylinder each with one side of the piston therein, valves mounted in said dividing wall in said valve chamber, and means for tripping said valves at the ends of the stroke of the piston.

8. In a hydraulic motor construction, a cylinder, a piston therein, a tubular piston stem divided longitudinally mounted in said cylinder for reciprocation, a valve chamber construction borne by said piston stem adjacent its end externally of said cylinder, a dividing wall in said valve chamber forming compartments therein, valves slidably mounted in said dividing wall and adapted to control the communication between said compartments and said tubular stem, and means for moving said valves at predetermined intervals.

9. A hydraulic motor comprising a cylinder, a base, standards thereon arranged to receive one end of said cylinder to position the same, a standard on said base near the opposite end of said cylinder, and means associated therewith to secure said cylinder in place.

10. A hydraulic motor comprising a cylinder, a base, a pair of standards thereon adapted to receive said cylinder at one end, a standard at the opposite end of said cylinder, and means associated with said standard to engage said cylinder for alining the same in position in said standards, and securing the same thereto.

11. A hydraulic motor comprising a cylinder, an extension at one end thereof, a base, a pair of standards thereon formed to receive said extension, a standard arranged on said base, a screw in said standard adapted to engage a designated point in the opposite end of said cylinder to aline and to secure said cylinder in proper operating position.

12. In a hydraulic motor construction, a cylinder having an extension at one end and a cap at the other end, a base, a pair of standards thereon arranged to embrace said extension, a standard arranged on said base, a screw therein adapted to engage said cap, whereby said cylinder is alined upon and secured to said base.

In testimony whereof I affix my signature in the presence of two witnesses.

ISIDOR YASSENOFF.

Witnesses:

HARRY E. BULEN,

J. ELWOOD BULEN.